United States Patent [19]

Yoshimura et al.

[11] Patent Number: 5,172,057
[45] Date of Patent: Dec. 15, 1992

[54] MAGNETIC ENCODER INCLUDING PLURAL MAGNETIC POLE LINES HAVING DIFFERING MAGNETIC PITCHES AND PLURAL MAGNETIC RESISTANCE EFFECT ELEMENTS

[75] Inventors: Kuniaki Yoshimura, Kumagaya; Makio Sei, Tokyo; Takehiko Sagara; Hideo Murata, both of Kumagaya, all of Japan

[73] Assignee: Hitachi Metals, Ltd., Tokyo, Japan

[21] Appl. No.: 613,727

[22] PCT Filed: Apr. 10, 1990

[86] PCT No.: PCT/JP90/00481

§ 371 Date: Nov. 30, 1990

§ 102(e) Date: Nov. 30, 1990

[87] PCT Pub. No.: WO90/12290

PCT Pub. Date: Oct. 18, 1990

[30] Foreign Application Priority Data

Apr. 13, 1989 [JP] Japan .................................. 1-94135

[51] Int. Cl.$^5$ .......................... G01R 33/06; H01L 43/08
[52] U.S. Cl. ...................... 324/207.21; 324/207.22; 307/309; 360/113; 360/121; 338/32 R
[58] Field of Search .................. 324/207.21, 235, 174, 324/207.22, 252, 173, 207.25, 207.23, 212, 232, 226, 227; 307/309; 338/12, 32 R, 195, 32 H; 360/97.01, 100.1, 86, 87, 88, 113, 119, 131–137, 121

[56] References Cited

U.S. PATENT DOCUMENTS

| | | | |
|---|---|---|---|
| 3,063,039 | 11/1962 | Taft | 360/136 X |
| 3,159,711 | 12/1964 | Schut | 360/136 X |
| 3,197,750 | 7/1965 | Smith, Jr. | 360/100.1 |
| 4,021,728 | 5/1977 | Makino et al. | 324/235 X |
| 4,274,053 | 6/1981 | Ito et al. | 324/207.21 X |
| 4,337,288 | 6/1982 | Takenaka et al. | 360/136 X |
| 4,361,805 | 11/1982 | Narimatsu et al. | 324/207.21 |
| 4,480,248 | 10/1984 | Sudo et al. | 324/207.21 X |
| 4,599,561 | 7/1986 | Takahashi et al. | 324/207.21 X |
| 4,717,979 | 1/1988 | Washisu | 324/207.21 X |
| 4,731,580 | 3/1988 | Indo | 338/32 R X |
| 4,766,376 | 8/1988 | Takahashi et al. | 324/207.21 |
| 4,786,870 | 11/1988 | Kawamata et al. | 324/207.21 |
| 4,866,382 | 9/1989 | Carmen | 338/32 R X |
| 4,954,803 | 9/1990 | Iijima et al. | 338/32 R |

*Primary Examiner*—Gerard R. Strecker
*Assistant Examiner*—Warren S. Edmonds
*Attorney, Agent, or Firm*—Wenderoth, Lind & Ponack

[57] ABSTRACT

The magnetic encoder of the present invention includes a magnetic signal generating drum having plural magnetic pole lines respectively having different magnetization pitches. Magnetic signals are repeatedly generated from the plural magnetic pole lines. A magnetic sensor is provided which includes plural magnetic resistant effect elements for converting the respective magnetic signals generated from the plural magnetic pole lines into electric signals. The plural magnetic resistant effect elements respectively confront the plural magnetic pole lines and output electric signals of different pulse numbers in accordance with incident magnetic signals. The magnetic signals generated from the plural magnetic poles lines and incident on the magnetic resistant effect elements are less that an anisotropic magnetic field level of the respective magnetic resistant effect elements. As such, respective values and waveform shapes of signals output by each of the magnetic resistant effect elements is substantially the same.

5 Claims, 8 Drawing Sheets

Magneto-sensitive pattern width
Wa < Wb < Wc

FIG. 13

Medium film thickness / magnetized pitch and surface-magnetic field strength (Calculated value)

MAGNETIC ENCODER INCLUDING PLURAL MAGNETIC POLE LINES HAVING DIFFERING MAGNETIC PITCHES AND PLURAL MAGNETIC RESISTANCE EFFECT ELEMENTS

BACKGROUND OF THE INVENTION

1. Field of the Invention

This invention relates to a magnetic encoder for performing positional detection by converting a change in magnetic field into an electric signal with respect to elements having a so-called magnetic resistant effect in which an electric resistance varies in accordance with an incident magnetic field, and more particularly, the invention relates to an improvement of the magnetic encoder in which the signal-detecting accuracy is enhanced.

2. Description of the Related Art

A highly accurate positional sensor or rotary sensor is necessary in a wide variety of technical fields, including the fields of NC machine tools, robots, OA instruments, VTRs, etc. In these industrial fields, various servo-motors and rotary encoders are utilized. With the development of OA and FA technologies, sensors having higher operating speeds and reliability are desired. Under these circumstances, for instance, conventional optical techniques are often used to realize a rotary sensor. However, such a sensor is composed of semiconductor elements such as photo-cells and LEDs, and is thus sensitive to dust and insufficiently stable in response to a change in temperature. Also, optical sensors suffer the additional drawbacks of numerous composing parts and complicated structures.

Accordingly, in recent years, magnetic type sensors using the magnetic resistance effect have been developed. Such sensors have a higher detecting accuracy and temperature stability, and are relatively insensitive to dust, and thus they are applied in many fields.

Figure 5:
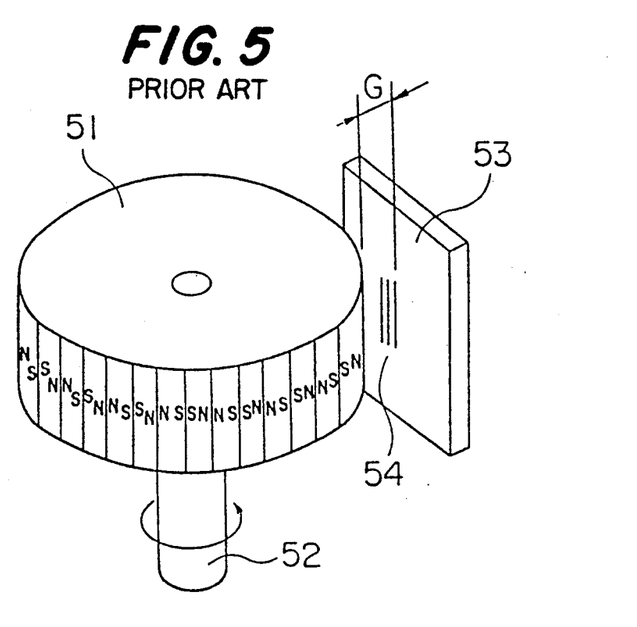
FIG. 5 is an enlarged schematic view of a conventional magnetic encoder.

FIG. 5 shows a schematic oblique sectional view of the conventional magnetic rotary sensor. A rotary drum 51 rotates together with a rotary shaft 52, for instance, in the rotational direction identified by the arrow. A magnetic recording medium layer is provided on the peripheral surface of the rotary drum 51 in the form of NS-magnetic poles. The magnetic recording medium layer, for instance, may be magnetic coating films such as gamma-iron, etc., or may be formed of strontium ferrite, etc.

The detecting accuracy conforms to the number of magnetic poles selected. When there are several hundred to several thousand magnetic poles, the width of a single magnetic pole will be formed by a very narrow micro-magnet.

A magnetic sensor 53 is arranged to confront the magnetized surface of the rotary drum 51 and is provided with a magnetic resistant element unit 54 formed of plural magnetic sensing patterns (consisting of strongly magnetized thin film patterns having the magnetic resistant affect) formed on a glass board. The magnetic sensor 53 is spaced a specified interval G within the magnetizing range of the magnetic field of the micro-magnets of the rotary drum 51.

Upon rotation of the rotary drum 51, the magnetic field on the surface of drum 51 travels towards the confronting magnetic resistant element unit 54, whereby each magneto-sensitive pattern of the magnetic resistant element unit 54 undergoes electro-magnetic conversion in which the strength of the incident magnetic field changes the resistance value of the pattern. Thus, an electric signal is issued in response, and detection is effected of the rotary speed and position of the drum 51.

The conventional magnetic encoder as described above and as shown in FIG. 5 includes a magnetic drum for repeatedly generating a magnetic signal and a magnetic sensor confronting the magnetic drum in non-contact parallel form through the specified interval G. Also, the magnetic resistant element unit of the magnetic sensor is composed of plural magneto-resistive patterns coupled to electric components. According to such a magnetic encoder, for instance, it is possible to promptly and accurately detect the position of a moving object and/or the rotary speed of motors such as numerical control (NC)-machines or robots.

As the above mentioned control systems are desired to achieve various functions and higher accuracy, compact and high performance detecting instruments are desired as well. For instance, a magnetic encoder having high and low rotary speed and/or positional detection with high accuracy is desirable. To meet such requirements, it is necessary to generate an output signal or electric signal having different pulse numbers. However, the conventional magnetic encoder, is as mentioned before, arranged having one magnetic pole line on the peripheral surface of a rotary drum, and thus cannot realize such requirements. Further, the provision in combination of plural magnetic encoders would result in a complicated structure having numerous parts, and thus poses problems with respect to the desirability of a compact device.

Figure 10:
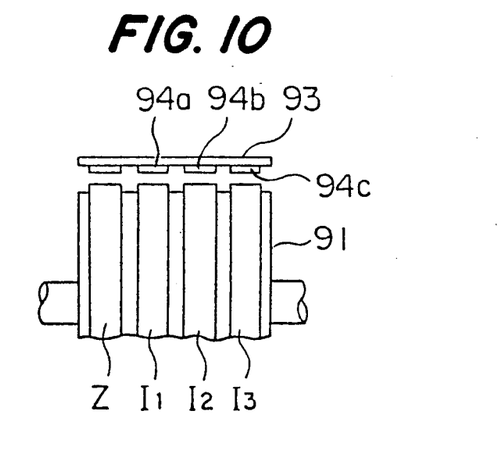
FIG. 10 shows a constitution example of a magnetic encoder of a multi-output signal.

Accordingly, the present inventors have solved these problems as shown in FIG. 10 by the provision of an increment phases $I_1$, $I_2$, $I_3$ composed of plural magnetic pole lines having different magnetizing pitches (different numbers of magnetic pole arrangements) and a Z-phase for inducing a standard point signal on the peripheral surface of a rotary drum 91. Also, the magnetic encoder is further provided with a sensor 93 composed of independent magnetic resistant effect element units 94a, 94b, 94c respectively confronting each increment phase $I_1$, $I_2$, $I_3$. By such a composition, output signals having different pulse numbers can be induced. Thus, for instance, a low-pulse number is applied for high-speed rotation, and a high-pulse number is applied for low-speed rotation, and thereby a highly accurate detection can be made. Simultaneous detection can be made for the signals of the low-pulse number and the high-pulse number, whereby subsequent circuit-processing can make further synthesis of a more accurate signal pulse.

Figure 11:
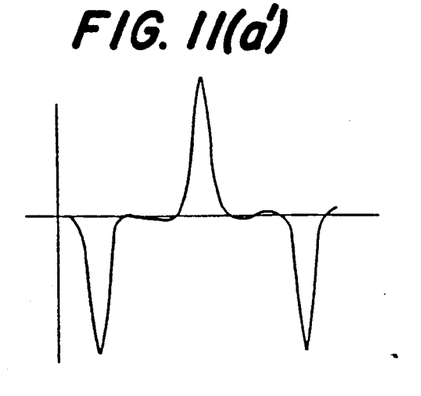
Figure 11A:
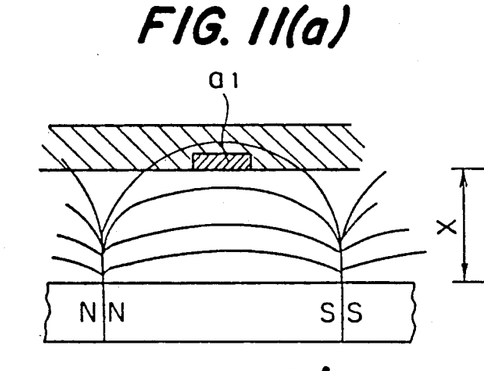
Figure 11B:
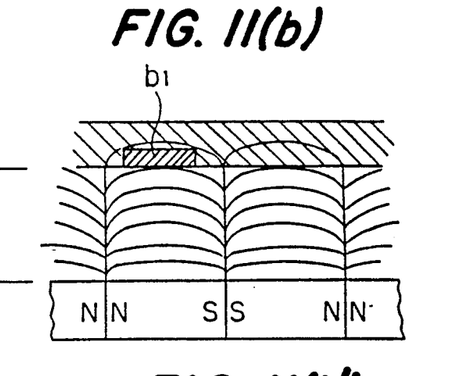

However, as a result of various review tests, when the increment phases $I_1$, $I_2$, $I_3$ having different magnetic pitches are arranged on the same rotary drum as described above, the following problems have been found. As shown in schematic views FIG. 11 (a) and (b), the provision of numerous magnetic poles having a shorter distance between poles gradually results in a shorter travelling distance of the effective magnetic flux $\Phi$ even when the magnetic characteristics of the magnetic recording medium itself would be the same. Thus, the value of the output signal caused at the magnetic resistant element appears differently. For instance, the signal waveform detected by magnetic resistant elements $a_1$ and $b_1$ located at the same distance x from the medium surface will appear as shown in FIG. 11 (a') and (b'), and the level of signal, and waveform thereof, and the waveform-distortion are different. Thus, it is difficult to practically apply such an arrangement, and no realization of such a magnetic encoder for precision instruments was found.

This invention is intended to offer a magnetic encoder for outputting plural detecting signals having an equal output value and waveform-shape.

SUMMARY OF THE INVENTION

The present invention includes opposite arranged and spaced apart plural magnetic resistant effect elements and plural magnetic pole lines. The magnetic pole lines cause a magnetic field which is less than an anisotropic magnetic field level of the magnetic resistant effect elements to be incident on a strong magnetic thin film pattern of the elements.

The magnetic encoder of the present invention includes a magnetic signal generating drum having plural magnetic pole lines respectively having different magnetization pitches. Magnetic signals are repeatedly generated from the plural magnetic pole lines. A magnetic sensor is provided which includes plural magnetic resistant effect elements for converting the respective magnetic signals generated from the plural magnetic pole lines into electric signals. The plural magnetic resistant effect elements respectively confront the plural magnetic pole lines and output electric signals of different pulse numbers in accordance with incident magnetic signals. The magnetic signals generated from the plural magnetic poles lines and incident on the magnetic resistant effect elements are less that an anisotropic magnetic field level of the respective magnetic resistant effect elements. As such, respective values and waveform shapes of signals output by each of the magnetic resistant effect elements is substantially the same.

BRIEF DESCRIPTION OF THE DRAWINGS

FIG. 3. (a), (b) and (c) are a plan view and sectional views of a magnetic drum used in the embodiment.

FIG. 6 (a) and (b) are an enlarged schematic view for the detecting part of the conventional magnetic encoder shown in FIG. 5 and an equivalent circuit diagram.

FIG. 7 (a) and (b) are diagrams of one magneto-sensitive pattern and its properties.

FIG. 8 (a) and (b) are diagrams describing the magnetic drum and surface magnetic strength

FIG. 11 (a), (a'), (b) and (b') are schematic diagrams of output-signal waveform in the same spacing in case of different magnetizing pitches.

DETAILED DESCRIPTION OF THE PREFERRED EMBODIMENTS

Figure 7A:
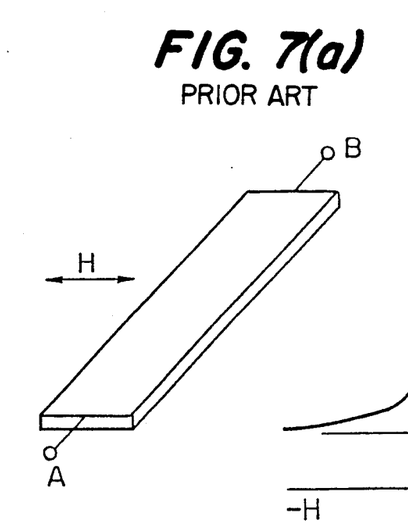
Figure 7B:
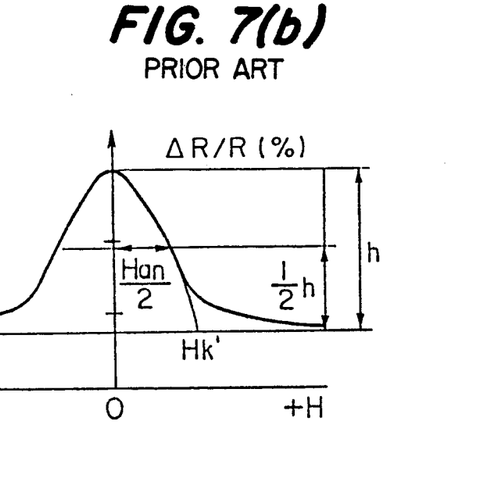

Initially, reference is made to FIG. 7 which is a diagram for describing the signal detection of a magnetic resistant effective element. As shown in FIG. 7(a), a magneto-sensitive pattern consists of a strong magnetic thin film which exhibits the magnetic resistant effect. When a magnetic field H is incident at a right angle direction relative to the longitudinal direction of the pattern, the resistance value between both ends A and B of the pattern changes as shown in FIG. 7(b). Hk' denotes an anisotropic magnetic field level of the pattern and is expressed by the following formula.

$$Hk' = H_D + Hk^0$$

$$H_D = (4 \pi Ms) t/W$$

Figures 8A, 8B:
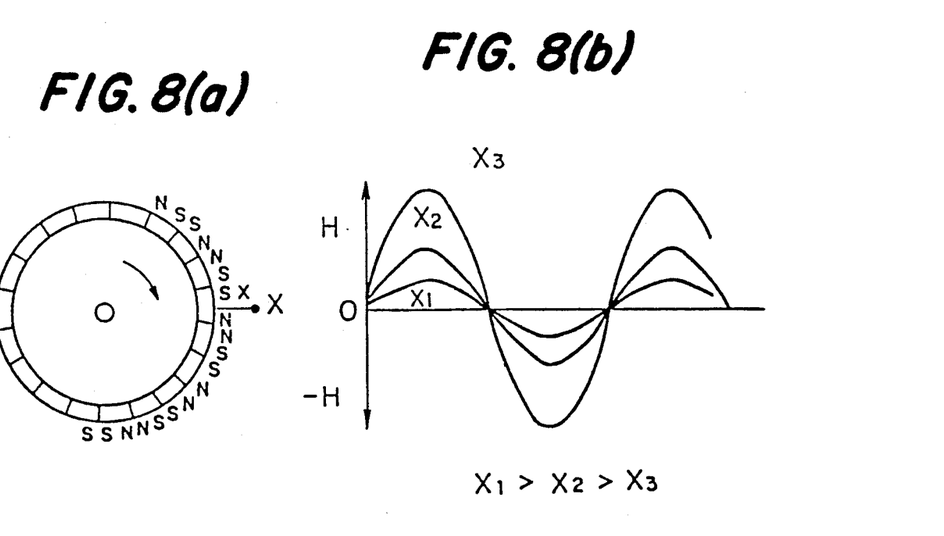

Where,
Hk$^0$: Anisotropic magnetic field of magnetic film
H$_D$: Anti-magnetic field
4 π Ms: Saturated magnification of magnetic film
t: Film thickness of magnetic film
W: Width of magneto-sensitive pattern On the other hand, the strength of the magnetic field (magnetic flux leakage obtained upon rotation time of the magnetic drum) at the position X a distance x from the surface of the magnetic drum is as shown in FIG. 8. The amplitude strength is clearly dependent on the distance x.

Figures 6A, 6B:
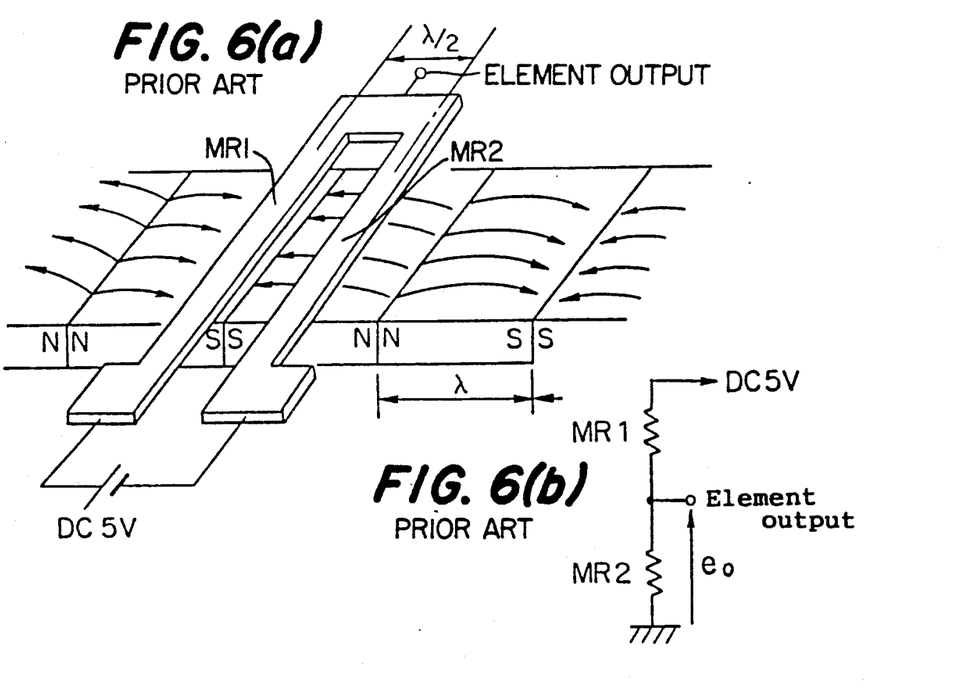
Figure 9:
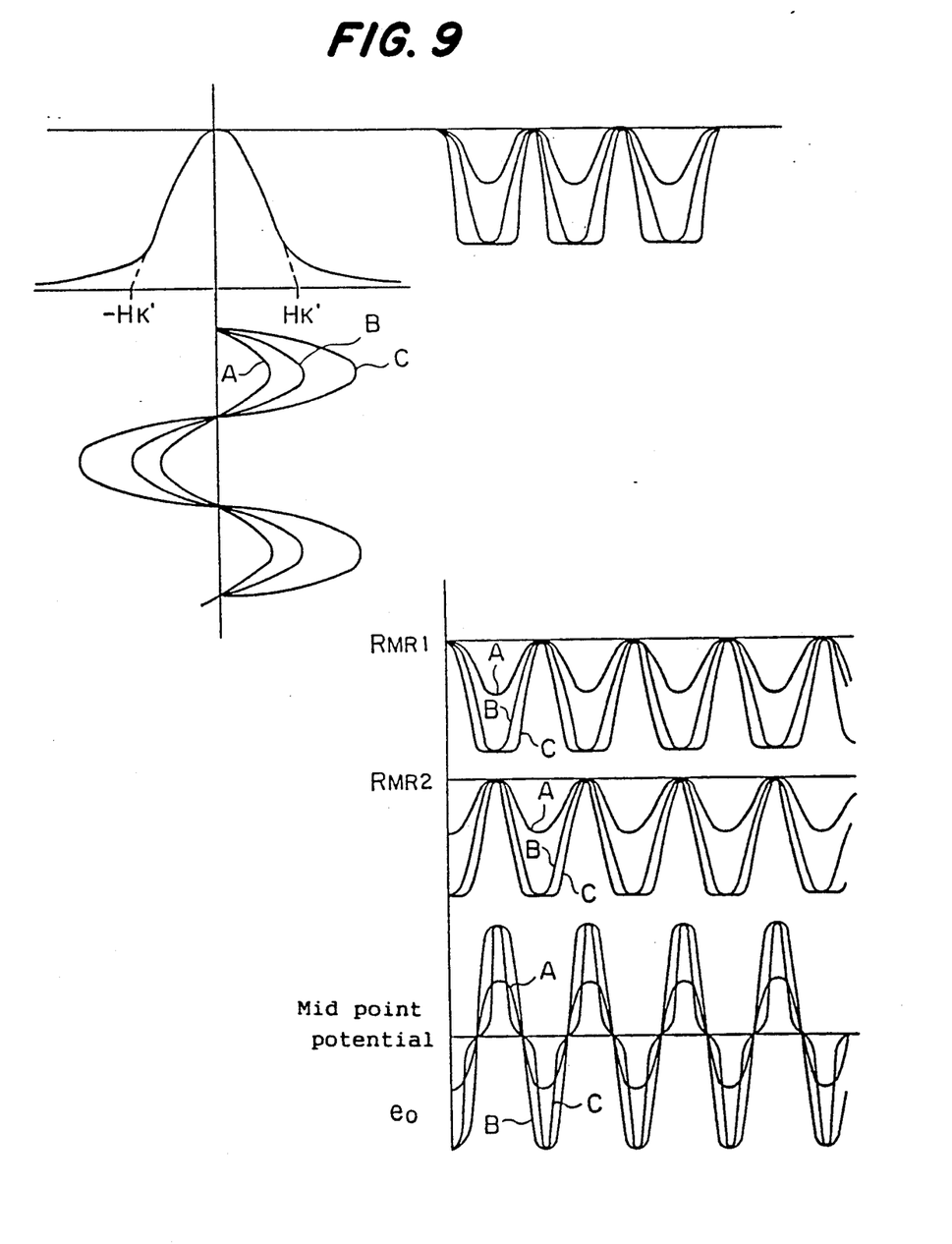
FIG. 9 is a diagram demonstrating a change of output signal and resistance value relative to a magnetic field power.

Accordingly, if each magneto-sensitive pattern of the magnetic resistant effective element has a structure as shown in FIG. 6(a), and a surface-magnetic field is periodically input by drum rotation, an equivalent circuit is obtained as shown in FIG. 6(b), and resistance value changes as shown in FIG. 9, with the magneto-sensitive pattern having resistant elements MR$_1$ and MR$_2$, and mid-point potential e$^0$. The larger input magnetic field C will aggravate the signal accuracy by distortion of the signal waveform, and thus it is very difficult to use the same for later circuit processing. On the other hand, the smaller input magnetic field A results in a small signal waveform, and thus it is difficult to use the same for later circuit processing.

Accordingly, distortion is reduced and the output is enhanced with a nearly equal level of maximum value of input magnetic field with anisotropic magnetic filed Hk' by patterning.

The magnetic encoder of the present invention is composed of a repeating magnetic signal generating means provided with plural magnetic pole lines arranged to move relative to magnetic resistant effect elements, and the magnetic resistant effect elements are opposed through specified gaps to the magnetic pole lines of the repeating magnetic signal generating means within the effective range of the magnetic field of the repeating magnetic signal generating means.

In such a magnetic encoder it is possible to adopt technical means to provide plural magnetic pole lines having different numbers of magnetic poles, to provide a relatively small gap between the magnetic resistant effective element and the magnetic pole lines having a large number of magnetic poles as compared to the gap between the magnetic resistant effective element and a magnetic pole line having a smaller number of magnetic poles, and to compose a signal waveform proximated to the shape and value of the output signal of each magnetic resistant effective element.

Further, in such a magnetic encoder, it is possible to adopt technical means for approximating the signal waveform and width of the output signal of each magnetic resistant effective element by changing the anisotropic magnetic field $H_k'$ by patterning with various changes of the width dimensions of the magneto-sensitive patterns at each magnetic resistant effective element set opposite to each magnetic pole line, and providing plural magnetic pole lines having different numbers of poles.

The magnetic encoder of this invention may be adopted to approximate the signal waveform shape and value of the output signal of each magnetic resistant effective element, by making uniform a magnetic field force as obtained on the surface of the magnetic resistant effective element opposing the magnetic poles, changing a thickness of a magnetic recording medium film of each magnetic pole line unit of the magnetic drum, and equipping the plural magnetic pole lines with a different number of magnetic poles.

Moreover, according the invention it is possible to adopt a flat drum instead of a rotary drum as the magnetic drum, so as to form a flat magnetic encoder which is known in this technical field.

By the above-mentioned constitution of the invention, it is possible to obtain a convenient output signal waveform for later circuit processing in which the detected output signal achieves a maximum output signal amplitude value in the pseudo-sine wave without distortion at the magnetic resistant effective elements. That is, in the magnetic encoder of the invention, an optimal signal waveform can be obtained for the detected output signal obtained by the magnetic resistant effective elements regardless of the magnetic-pole number and type of magnetic recording medium of the magnetic drum.

In the invention, moreover, it is possible to approximate the signal waveform shape and value of the output signal of the magnetic resistant effective element caused by the size of the magnetic field power or length of the travel distance of the magnetic flux by the quantity of the plural magnetic poles, for instance, the increment phase. That is, while the interval is extended on the magnetic resistant effective element opposed to the increment phase of the large number of magnetic poles, the interval is reduced on the magnetic resistant effective element opposed to the increment phase of the lesser number of magnetic poles. Thereby, it is possible to match the magnetic field power acting on the magneto-sensitive pattern composing each magnetic resistant effective element to nearly the same level.

Also, in the invention, it is possible to effect nearly a same level matching for the signal waveform shape and output signal, namely, a magneto-sensitive pattern resistance change rate of the magnetic resistant effect element unit relative to different powers of the magnetic field from each magnetic pole obtained on the surface of each magnetic resistant effect element by changing the anisotropic magnetic field $Hk'$ by patterning, by forming different width dimensions of the magneto-sensitive pattern of each magnetic resistant effect element while keeping a same dimension of the interval distance of each magnetic pole arrangement of the magnetic drum arranged opposite to the respective magnetic resistant effect element of the magnetic sensor.

Figure 12A:
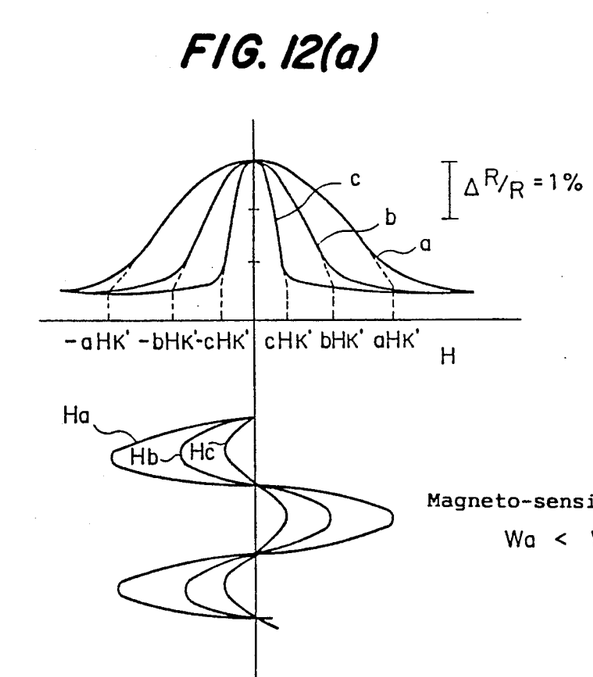
FIG. 12(a) and (b) are diagrams describing the change pattern width at a magneto-sensitive part to make a change of resistance value the same as with a surface-magnetic filed strength of each magnetic resistance effective element.
Figure 12B:
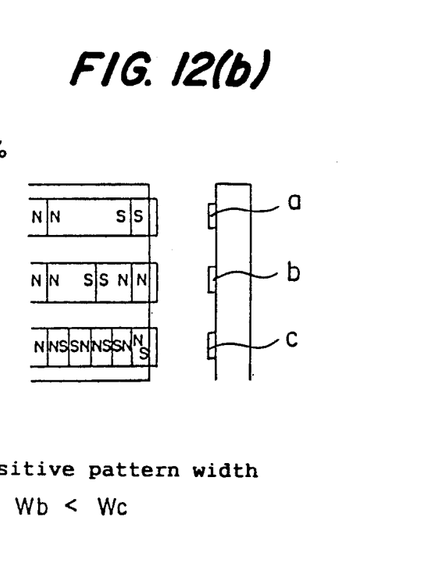

For explaining a first embodiment of the invention, FIG. 12 shows the relation between each magnetic resistant element a,b,c and its surface magnetic field strength, and magneto-sensitive pattern width Wa,Wb,Wc of each magnetic field resistant effective element. The anisotropic magnetic field in the case of Wa>Wb>Wc of the magneto-sensitive pattern width is aHk'<bHk'<cHk'. Thus, by forming each magneto-sensitive pattern width to match the magnetic field powers Ha, Hb, Hc on the surface of each magnetic resistant effective element, a nearly equal level can be obtained for each pattern resistance change rate under the state of keeping a same interval of the distance between the magnetic sensor and magnetic drum. Thus, a nearly equal signal waveform shape and output level of the signal output from each magnetic resistant effective element can be obtained.

Next, a second embodiment will be explained. By changing the film thickness of the magnetic recording medium of plural of magnetic pole lines having a different number of magnetic poles (namely, a different magnetizing pitch) of the magnetic signal generating means, an adjustment can be made to make the power of magnetic field incident to the oppositely arranged magnetic resistant effective element nearly the same, and it is thus possible to match the signal waveform shape and value of the output signal of each magnetic resistant effective element under the state of keeping the interval distance at the same dimension.

Figure 13:
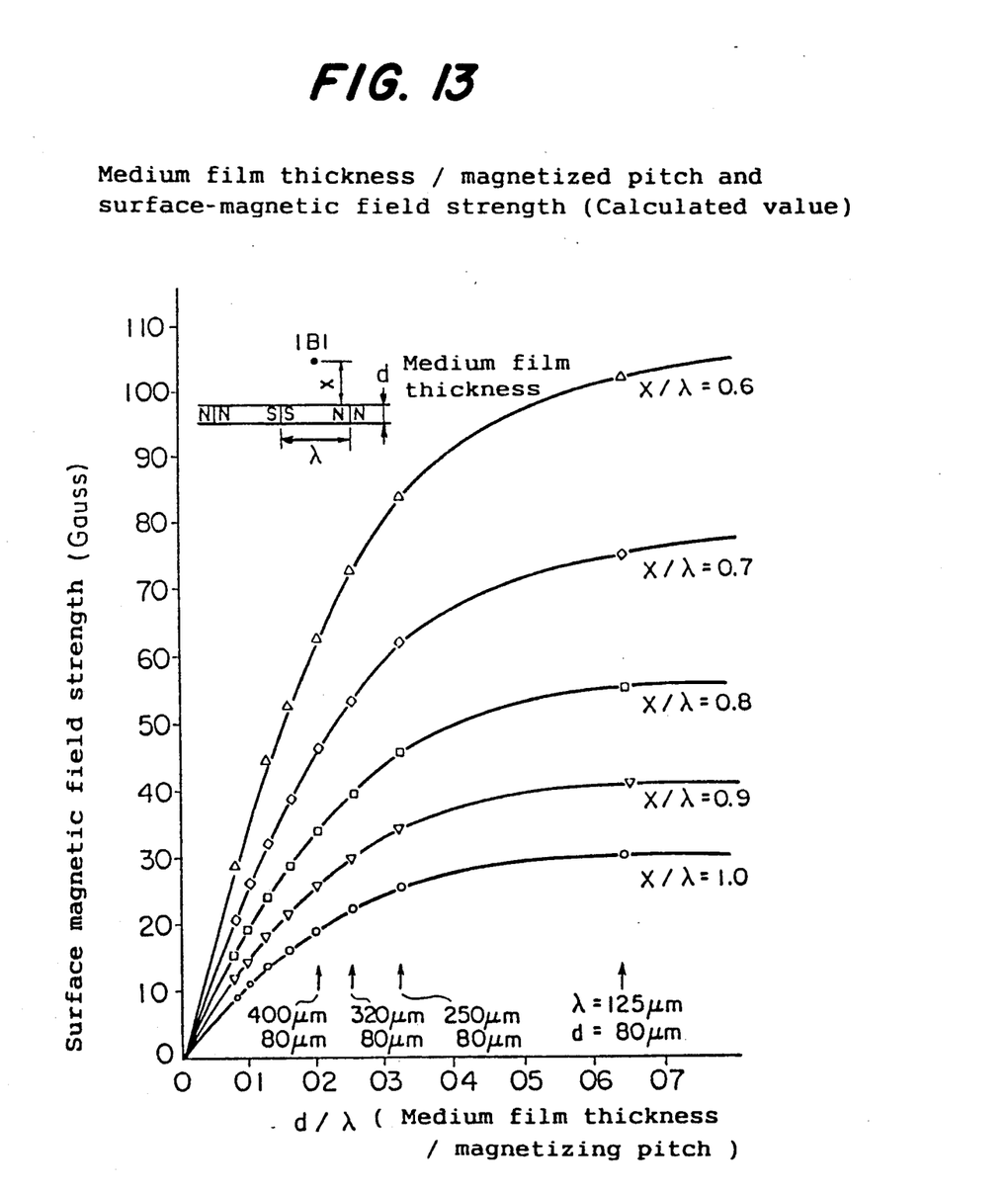
FIG. 13 is a diagram demonstrating the relation between the surface-magnetic field strength and magnetizing pitch and film thickness of a magnetic recording medium.

FIG. 13 depicts calculated results obtained by simulation using the limited element method for the strength of the surface-magnetic field and the magnetized pitch and film thickness of the magnetic recording medium using a magnetic coated film of Co-$\gamma$ Fe$_2$O$_3$ as the magnetic recording medium. As shown, it is understood that similar effects can be obtained by selecting the optimum film thickness at the magnetized pitch $\lambda$ of each magnetic pole-arranged unit even by fixing the spacing distance x and surface-magnetic strength.

Moreover, it is possible to match the output-signal waveform and the output-signal value by a proper combination of the above mentioned systems.

Figure 1:
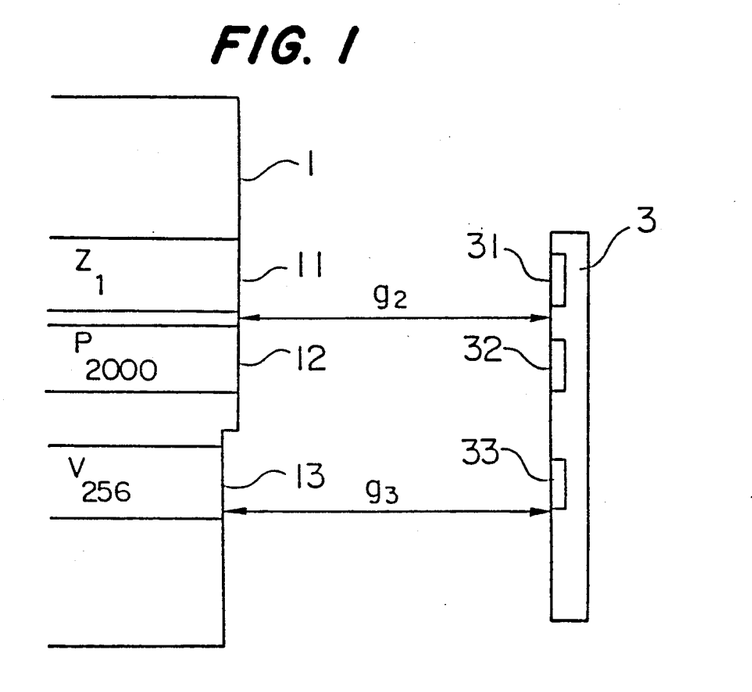
FIG. 1 is a sectional view of the main parts demonstrating one embodiment of this invention.

Referring now to FIG. 1 for an explanation of a third embodiment of the invention, a magnetic drum is equipped with three magnetic pole lines, i.e. a first P line of 2000 magnetized poles for detection of low-speed rotations, a second line of 256 magnetized poles for detection of high-speed rotations, and a third line of 1 magnetized pole for detecting a standard point. The pole lines are formed of a magnetic coated layer of magnetic paint having a magnetic powder consisting of Co-$\gamma$ Fe$_2$O$_3$ on the peripheral surface of a rotary drum composed of a non-magnetic material and having a diameter of 130 mm and an axial direction length of 25 mm. In this embodiment, a step difference is provided at the 256 magnetized pole line V to be a smaller path than the others.

Figure 2:
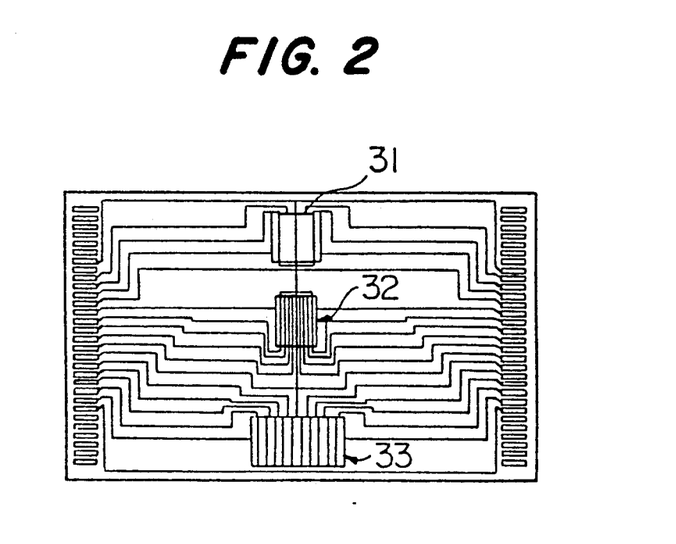
FIG. 2 is a diagram of the magnetic sensor used in the embodiment.

As shown in FIG. 2, a magnetic sensor used in this embodiment is composed of three magnetic resistant element units 31, 32 and 33. Each magneto-sensitive pattern width is set as follows: Z-unit, 10 $\mu$m; P-unit, 20 $\mu$m; V-unit, 10 $\mu$m. As such, the magnetic encoder of the invention is composed.

Figure 3A:
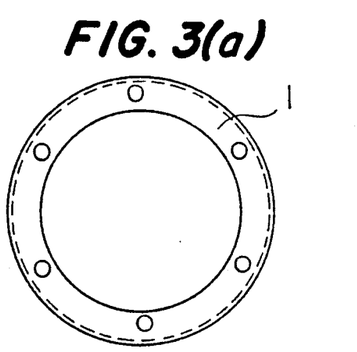
Figure 3B:
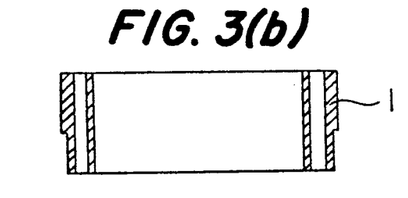
Figure 3C:
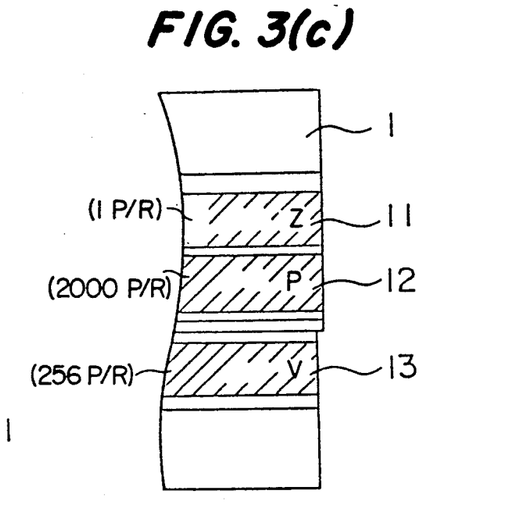

Reference is made to FIG. 3 showing a sectional side view of a magnetic encoder of the embodiment. As described above, the magnetic drum 1 has Z-phase magnetic pole line 11 for detecting the standard point, a P-signal magnetic pole line 12 as an increment phase, and V-signal phase magnetic pole line 13.

Three magnetic resistant effective elements 31, 32, 33 of the magnetic sensor 3 are respectively arranged confronting the Z-phase magnetic pole line 11, P-signal phase magnetic pole line 12, V-signal phase magnetic pole line 13. In this case, magnetic resistant effective elements 32 and 33 are respectively opposed to magnetized magnetic pole lines 12 and 13 through an interval $g_2 = 130$ μm and $g_3 = 665$ μm. Therefore, when the magnetic resistant effective element units 31~33 are equipped on the same plane, the V-signal phase magnetic pole line 13 radius is set to 535 μm smaller than that of P-signal phase magnetic pole line 12 on magnetic drum 1 (formed at a 1070 μm diameter). Also, the Z-phase magnetized unit 11 is formed in the same diameter as that of the P-signal phase magnetic pole line 12.

Figure 4:
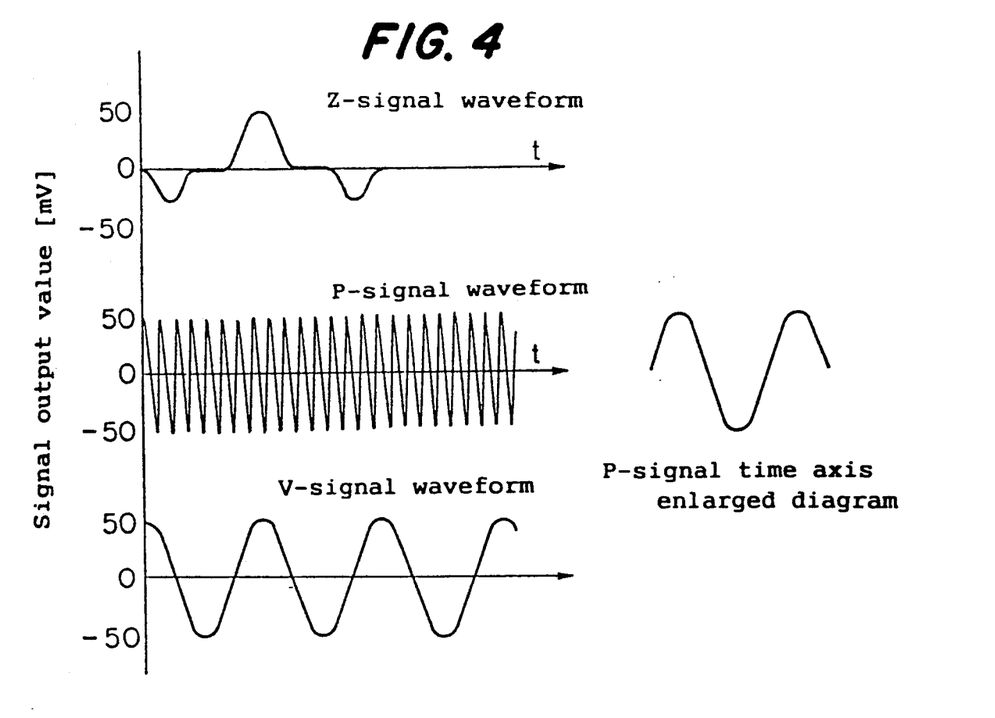
FIG. 4 is a diagram of each signal obtained by the embodiment.

In the above mentioned constitution, as shown in FIG. 4, the magnetic resistant effective elements 31~33 show nearly equal leveled output voltages of 50 mV and nearly equal shaped waveforms. As is readily apparent from FIG. 4, the invention provides equal leveled output signal values and waveforms.

In the above mentioned third embodiment, the interval between each pole line and each magnetic resistant element is varied to obtain a waveform and output signal value of equal levels even in the case of changing the film thickness of the magnetic recording medium or the width of the strong magnetic thin film pattern of the type described above.

As described above, it is possible according to the invention to obtain a plural number of output signals simultaneously from a single magnetic encoder composed of a magnetic drum and magnetic sensor, and thus the entire system can be made small and compact. Moreover, the component parts can be reduced and manufacture facilitated. Also, output signals having different pulse numbers can be simultaneously obtained, thus, for instance, simultaneous application can be made for output signals for both high and low speeds, and the detecting accuracy can be greatly elevated.

We claim:

1. A magnetic encoder comprising:
   a magnetic signal generating means, having plural magnetic pole lines respectively having different magnetization pitches, for repeatedly generating respective magnetic signals from said plural magnetic pole lines;
   a magnetic sensor including plural magnetic resistant effect elements for converting the respective magnetic signals into respective electric signals, said plural magnetic resistant effect elements respectively confronting said plural magnetic pole lines and outputting said respective electric signals having different pulse numbers in accordance with incident magnetic signals respectively generated from said plural magnetic pole lines;
   wherein a level of said respective magnetic signals generated from said plural magnetic pole lines and incident on said plural magnetic resistant elements is less than an anisotropic magnetic field level of said respective magnetic resistant effect elements,
   wherein respective values and waveform shapes of said respective electric signals output by each of said magnetic resistant effect elements are substantially the same,
   wherein gaps between said magnetic pole lines and respective magnetic resistant effect elements are in accordance with the magnetization pitches of the magnetic pole lines respectively.

2. A magnetic encoder according to claim 1, wherein the gap between a magnetic pole line having a lesser magnetization pitch and a respective magnetic resistant effect element is smaller than the gap between a magnetic pole line having a larger magnetization pitch and a respective magnetic resistant effect element.

3. A magnetic encoder according to claim 2, wherein a step difference is provided on the magnetic pole line having the lesser magnetization pitch.

4. A magnetic encoder comprising:
   a magnetic signal generating means, having plural magnetic pole lines respectively having different magnetization pitches, for repeatedly generating respective magnetic signals from said plural magnetic pole lines;
   a magnetic sensor including plural magnetic resistant effect elements for converting the respective magnetic signals into respective electric signals, said plural magnetic resistant effect elements respectively confronting said plural magnetic pole lines and outputting said respective electric signals having different pulse numbers in accordance with incident magnetic signals respectively generated from said plural magnetic pole lines;
   wherein a level of said respective magnetic signals generated from said plural magnetic pole lines and incident on said plural magnetic resistant elements is less than an anisotropic magnetic field level of said respective magnetic resistant effect elements,
   wherein respective values and waveform shapes of said respective electric signals output by each of said magnetic resistant effect elements are substantially the same,
   wherein said magnetic resistant effect elements are respectively composed of plural magneto-sensitive patterns having strongly magnetized thin film patterns and wherein widths of the magneto-sensitive patterns are determined in accordance with the magnetization pitches of the respective magnetic pole lines.

5. A magnetic encoder according to claim 4, wherein the width of the magneto-sensitive pattern of the magnetic resistant effective element confronting a magnetic pole line having a lesser magnetization pitch is larger than the width of the magneto-sensitive pattern of the magnetic resistant effective element confronting a magnetic pole line having a larger magnetization pitch.

* * * * *